(12) United States Patent
Nagai et al.

(10) Patent No.: US 12,155,291 B2
(45) Date of Patent: Nov. 26, 2024

(54) POWER TOOL

(71) Applicant: MAKITA CORPORATION, Anjo (JP)

(72) Inventors: Hiroki Nagai, Anjo (JP); Takaya Yamada, Anjo (JP); Yuya Sano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 197 days.

(21) Appl. No.: 18/155,854

(22) Filed: Jan. 18, 2023

(65) Prior Publication Data

US 2023/0291274 A1 Sep. 14, 2023

(30) Foreign Application Priority Data

Mar. 11, 2022 (JP) .................. 2022-038663

(51) Int. Cl.
*H02K 7/04* (2006.01)
*H02K 7/14* (2006.01)
*H02K 21/16* (2006.01)
*B27B 9/00* (2006.01)

(52) U.S. Cl.
CPC ............... *H02K 7/04* (2013.01); *H02K 7/145* (2013.01); *H02K 21/16* (2013.01); *B27B 9/00* (2013.01)

(58) Field of Classification Search
CPC .......... H02K 7/04; H02K 7/145; H02K 21/16; H02K 1/276; H02K 9/06; H02K 1/12; H02K 1/22; H02K 1/278; H02K 15/165; B27B 9/00; B25F 5/00; B23D 47/12
See application file for complete search history.

(56) References Cited

U.S. PATENT DOCUMENTS

| | | | |
|---|---|---|---|
| 7,064,468 B2 | 6/2006 | Fujinaka | |
| 8,628,380 B2 | 1/2014 | Yang | |
| 9,870,627 B2 | 1/2018 | El Fakhri et al. | |
| 2014/0124231 A1 | 5/2014 | Hessenberger et al. | |
| 2014/0370791 A1 | 12/2014 | Lutz et al. | |
| 2018/0358854 A1* | 12/2018 | Inuzuka | H02K 1/276 |
| 2019/0044110 A1 | 2/2019 | Sheeks et al. | |

* cited by examiner

*Primary Examiner* — Mohamad A Musleh
(74) *Attorney, Agent, or Firm* — Oliff PLC (57) ABSTRACT

A power tool includes a resin member in a rotor that is less susceptible to breaking. A power tool includes a stator, a rotor rotatable relative to the stator at a speed of 30000 rpm or greater, and an output unit drivable by the rotor. The stator includes a stator core, an insulator fixed to the stator core, and a coil held on the insulator. The rotor includes a rotor core having a slot, a permanent magnet received in the slot in the rotor core, and a resin member fixing the rotor core and the permanent magnet. The resin member includes an annular portion protruding from an end face of the rotor core. The annular portion includes a cut portion.

20 Claims, 10 Drawing Sheets

|  | OUTER DIAMETER (mm) LD | INNER DIAMETER (mm) SD | HEIGHT (mm) LH | CUT HEIGHT (mm) SH | CUT VOLUME (mm$^3$) SV |
|---|---|---|---|---|---|
| EXAMPLE 1 | 21.0 | 16.0 | 6.0 | 1.5 | 327 |
| EXAMPLE 2 | 22.0 | 16.0 | 6.0 | 1.5 | 403 |
| EXAMPLE 3 | 23.0 | 16.0 | 6.0 | 1.5 | 482 |

POWER TOOL

CROSS-REFERENCE TO RELATED APPLICATIONS

This application claims the benefit of priority to Japanese Patent Application No. 2022-038663, filed on Mar. 11, 2022, the entire contents of which are hereby incorporated by reference.

BACKGROUND

1. Technical Field

The present disclosure relates to a power tool.

2. Description of the Background

In the technical field of power tools, a known power tool includes a motor, as described in U.S. Patent Application Publication No. 2014/0124231.

BRIEF SUMMARY

A motor includes a stator including coils and a rotor including permanent magnets received in slots in a rotor core. The rotor includes a resin member for fixing the rotor core and the permanent magnets. To adjust the rotational balance of the rotor, the resin member may be cut partially. In this structure, the resin member is to be less susceptible to breaking during rotation of the rotor.

A first aspect of the present disclosure provides a power tool, including:
- a stator including
  - a stator core,
  - an insulator fixed to the stator core, and
  - a coil held on the insulator;
- a rotor rotatable relative to the stator at a speed of 30000 revolutions per minute or greater, the rotor including
  - a rotor core having a slot,
  - a permanent magnet received in the slot in the rotor core, and
  - a resin member fixing the rotor core and the permanent magnet, the resin member including an annular portion protruding from an end face of the rotor core, the annular portion including a cut portion; and
- an output unit drivable by the rotor.

The power tool according to the above aspect of the present disclosure includes the resin member that is less susceptible to breaking during rotation of the rotor.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of a motor.

A power tool includes the motor. In the embodiments, a direction parallel to a rotation axis AX of the motor is referred to as an axial direction for convenience. A direction radial from the rotation axis AX of the motor is referred to as a radial direction or radially for convenience. A direction about the rotation axis AX of the motor is referred to as a circumferential direction, circumferentially, or a rotation direction for convenience. A direction parallel to a tangent of an imaginary circle about the rotation axis AX of the motor is referred to as a tangential direction for convenience.

A position nearer the rotation axis AX of the motor in the radial direction, or a radial direction toward the rotation axis AX of the motor, is referred to as radially inward for convenience. A position farther from the rotation axis AX of the motor in the radial direction, or a radial direction away from the rotation axis AX of the motor, is referred to as radially outside or radially outward for convenience. A position in one circumferential direction, or one circumferential direction, is referred to as a first circumferential direction for convenience. A position in the other circumferential direction, or the other circumferential direction, is referred to as a second circumferential direction for convenience. A position in one tangential direction, or one tangential direction, is referred to as a first tangential direction for convenience. A position in the other tangential direction, or the other tangential direction, is referred to as a second tangential direction for convenience.

Figure 1:
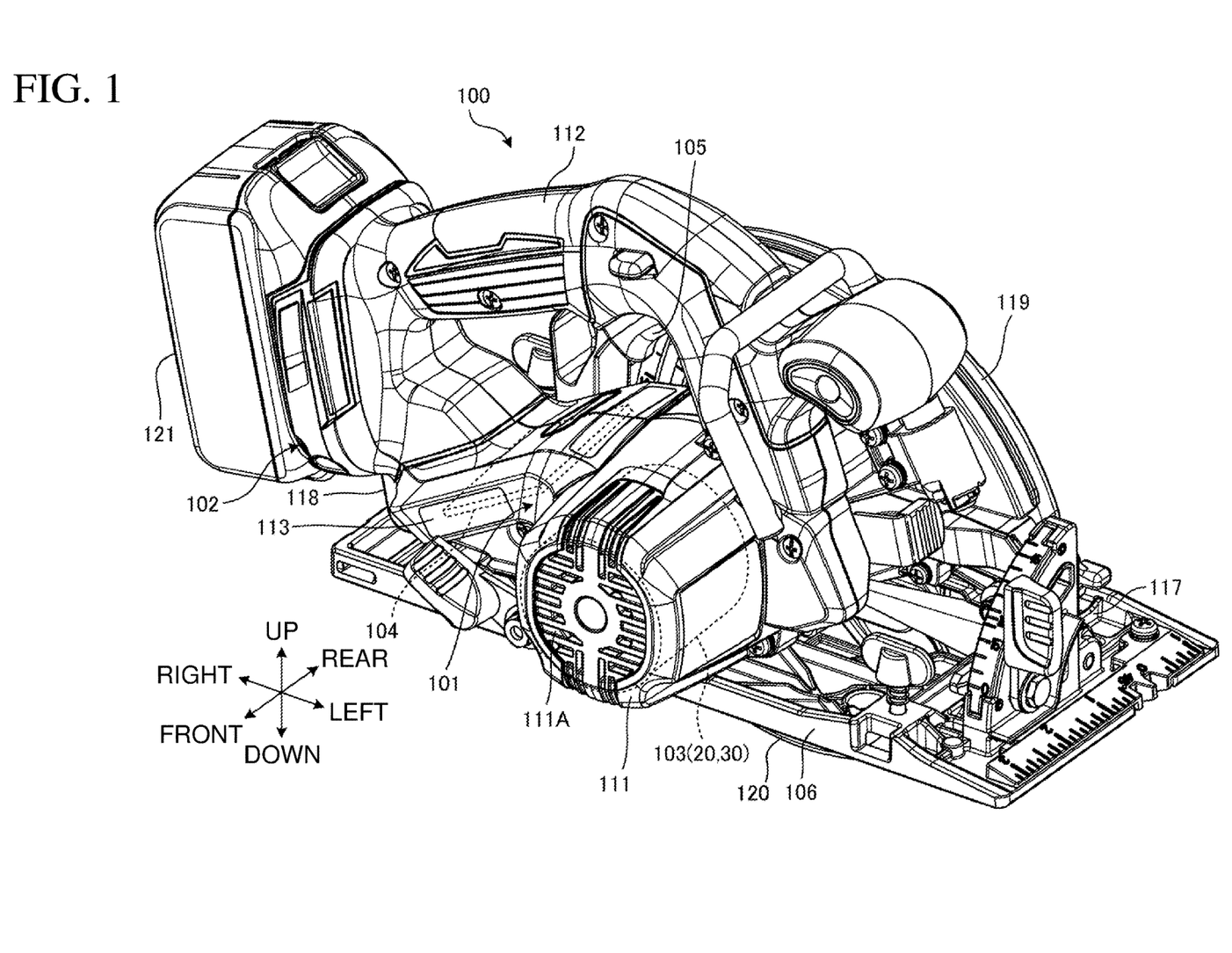
FIG. 1 is a perspective view of a power tool according to an embodiment.

FIG. 1 is a perspective view of a power tool 100 according to an embodiment. The power tool 100 according to the present embodiment is a circular saw. The power tool 100 includes a housing 101, a battery mount 102, a motor 103, a controller 104, and a trigger switch 105.

The housing 101 includes a motor compartment 111, a grip 112, and a controller compartment 113. The motor compartment 111 accommodates the motor 103. The motor compartment 111 has inlets 111A in its front surface. The grip 112 is located above the motor compartment 111 and the controller compartment 113. The controller compartment 113 accommodates the controller 104. The controller 104 controls the motor 103. The battery mount 102 is located on the right of the grip 112. The trigger switch 105 is located on the grip 112.

The power tool 100 includes a base 106, a left support 117, a right support 118, a fixed cover 119, and a rotary blade 120. The base 106 comes in contact with the upper surface of a workpiece (e.g., a piece of wood). The left support 117 and the right support 118 connect the housing 101 to the base 106. The fixed cover 119 is fixed to the housing 101. The rotary blade 120 rotates inside the fixed cover 119. When the motor 103 is driven, the rotary blade 120 rotates.

The motor 103 is a power source for the power tool 100. The motor 103 generates a rotational force for rotating the rotary blade 120. The motor 103 is a brushless motor.

Figure 2:
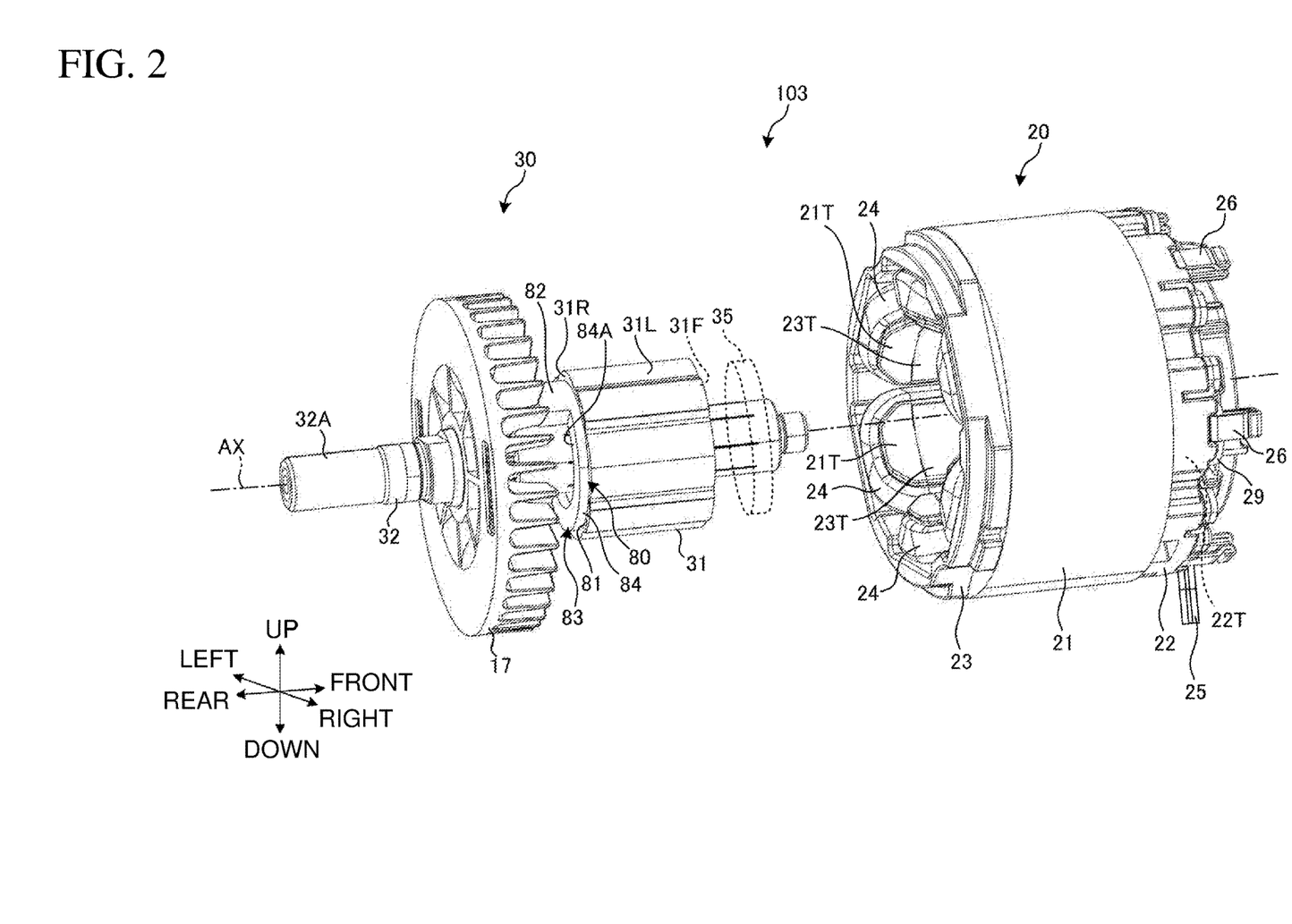
FIG. 2 is an exploded perspective view of a motor in the embodiment.

FIG. 2 is an exploded perspective view of an example of the motor 103. As shown in FIG. 2, the motor 103 includes a stator 20 and a rotor 30 rotatable relative to the stator 20. The stator 20 surrounds the rotor 30. The rotor 30 rotates about the rotation axis AX.

The stator 20 includes a stator core 21, a front insulator 22, a rear insulator 23, coils 24, a power line 25, and fusing terminals 26. The front insulator 22 and the rear insulator 23 may be integrally molded with and fixed to the stator core 21.

The stator core 21 includes multiple steel plates stacked on one another. The steel plates are metal plates formed from iron as a main component. The stator core 21 is cylindrical. The stator core 21 includes multiple (six in the present embodiment) teeth 21T to support the coils 24. The teeth 21T protrude radially inward from the inner surface of the stator core 21.

The front insulator 22 is an electrical insulating member formed from a synthetic resin. The front insulator 22 is located on the front of the stator core 21. The front insulator 22 is cylindrical. The front insulator 22 includes multiple (six in the present embodiment) protrusions 22T to support the coils 24. The protrusions 22T protrude radially inward from the inner surface of the front insulator 22.

The rear insulator 23 is an electrical insulating member formed from a synthetic resin. The rear insulator 23 is located on the rear of the stator core 21. The rear insulator 23 is cylindrical. The rear insulator 23 includes multiple (six in the present embodiment) protrusions 23T to support the coils 24. The protrusions 23T protrude radially inward from the inner surface of the rear insulator 23.

Each tooth 21T has a front end connecting to the rear end of the corresponding protrusion 22T. Each tooth 21T has a rear end connecting to the front end of the corresponding protrusion 23T.

The coils 24 are wound around the teeth 21T in the stator core 21 with the front insulator 22 and the rear insulator 23 in between. The stator 20 includes multiple (six in the present embodiment) coils 24. Each coil 24 is wound around the corresponding tooth 21T with the protrusion 22T and the protrusion 23T in between. Each coil 24 surrounds the tooth 21T, the protrusion 22T, and the protrusion 23T. The coils 24 and the stator core 21 are insulated from each other with the front insulator 22 and the rear insulator 23 in between.

The multiple coils 24 are formed by winding a single wire. The coils 24 adjacent in the circumferential direction are connected with a connection wire 29, which is a part of the wire. The connection wire 29 is a part of the wire between two adjacent coils 24. The connection wire 29 is supported on the front insulator 22.

A battery pack 121 serves as a power supply for the motor 103. The battery pack 121 supplies a drive current to the motor 103 through the controller 104. The controller 104 controls the drive current supplied from the battery pack 121 to the motor 103. The drive current from the battery pack 121 is supplied to the power line through the controller 104.

The rotor 30 includes a rotor core 31, a rotor shaft 32, and permanent magnets 33. The rotor 30 rotates about the rotation axis AX. The rotor 30 is rotatable relative to the stator 20 at a speed of 30000 rpm or greater.

Figure 3:
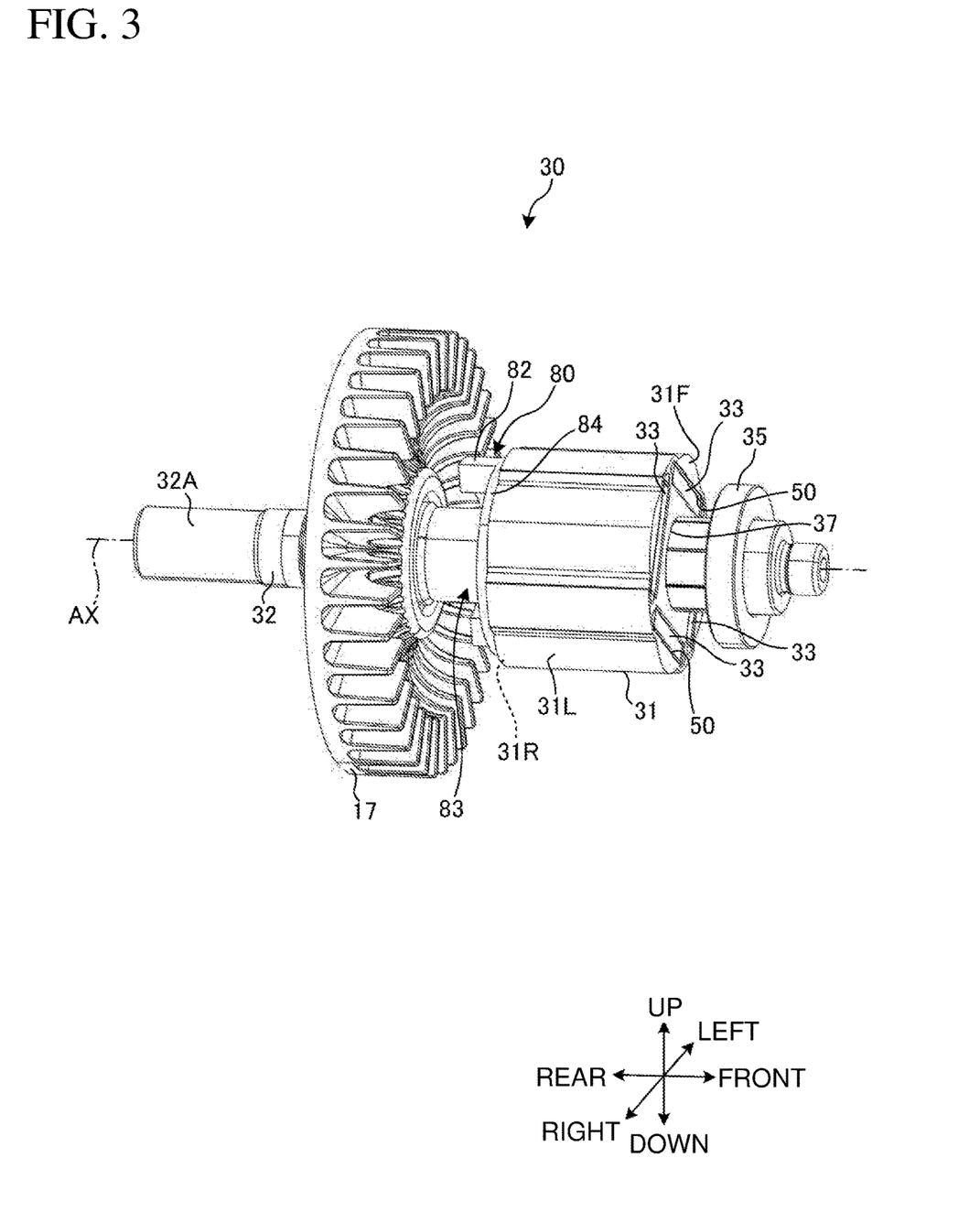
FIG. 3 is a perspective view of a rotor in the embodiment.
Figure 4:
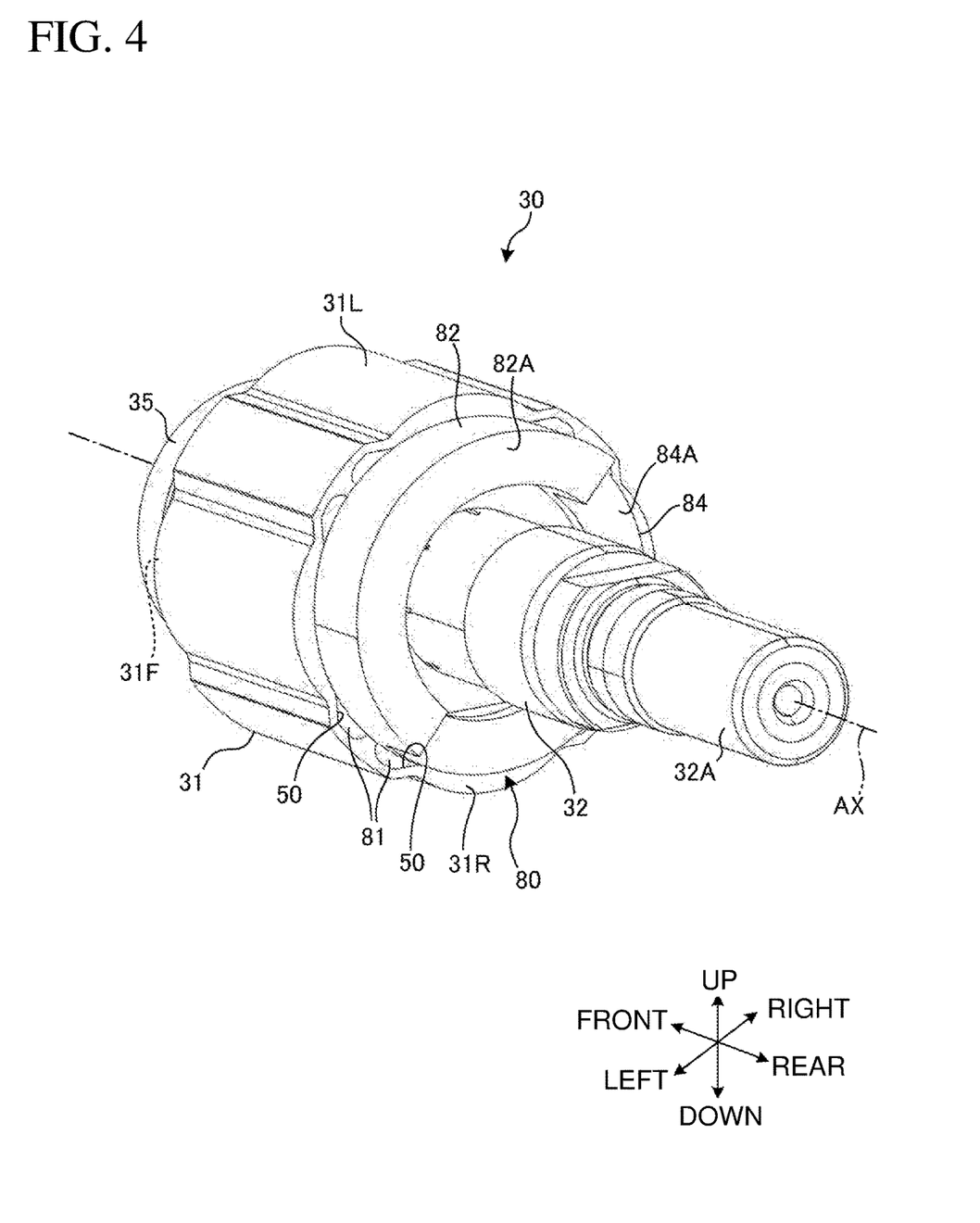
FIG. 4 is a perspective view of the rotor in the embodiment.
Figure 5:
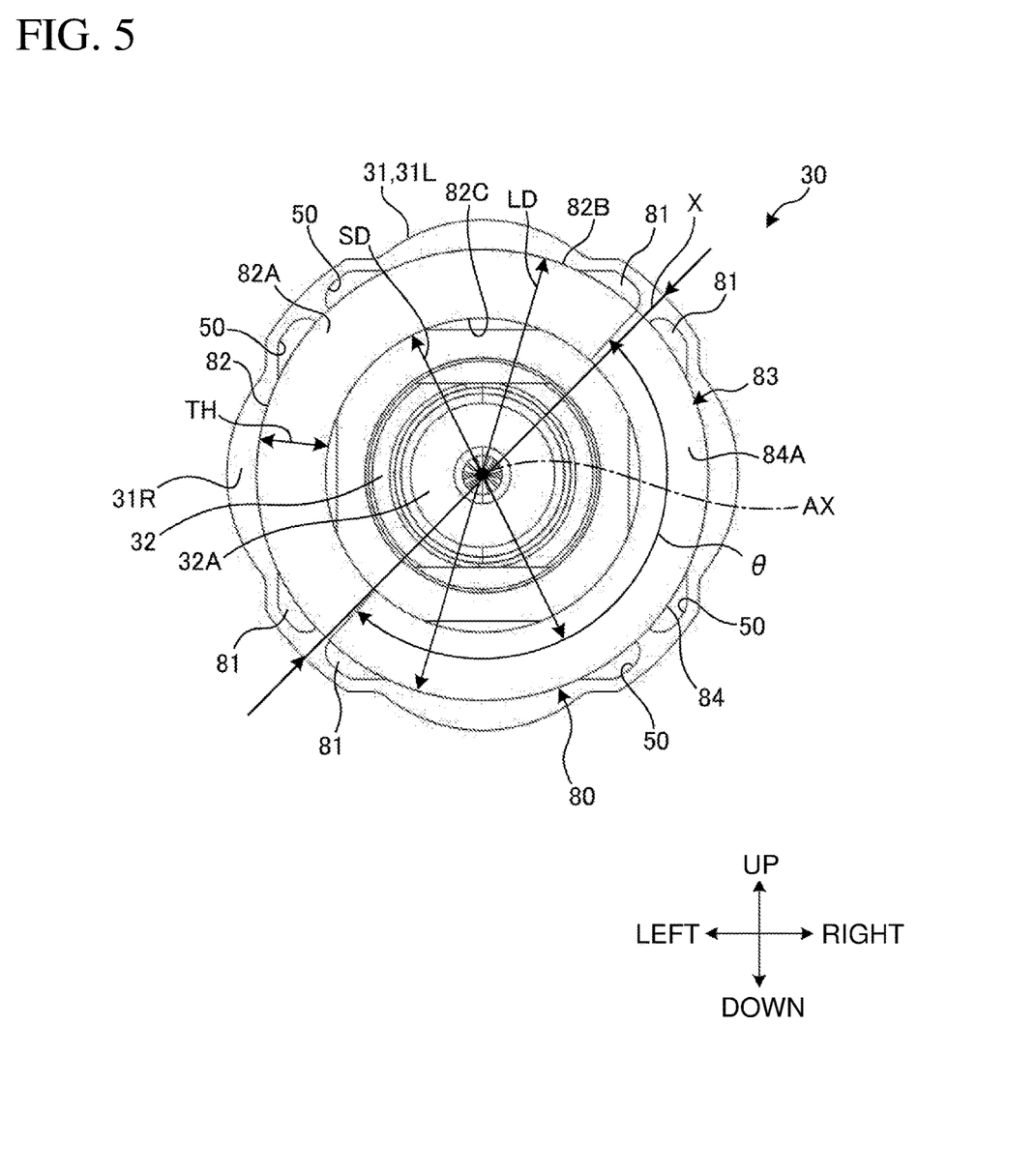
FIG. 5 is a rear view of the rotor in the embodiment.
Figure 6:
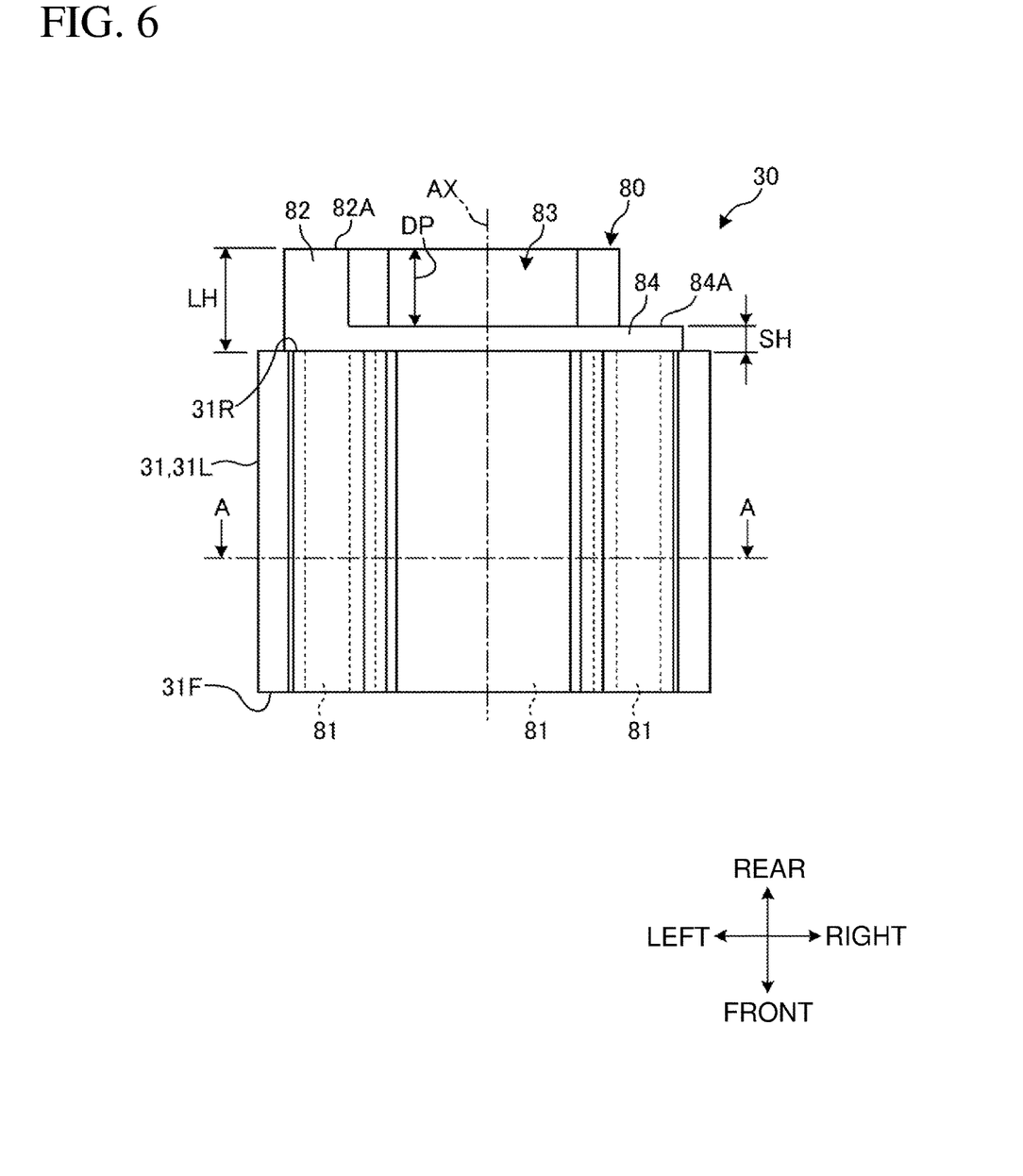
FIG. 6 is a top view of the rotor in the embodiment.
Figure 7:
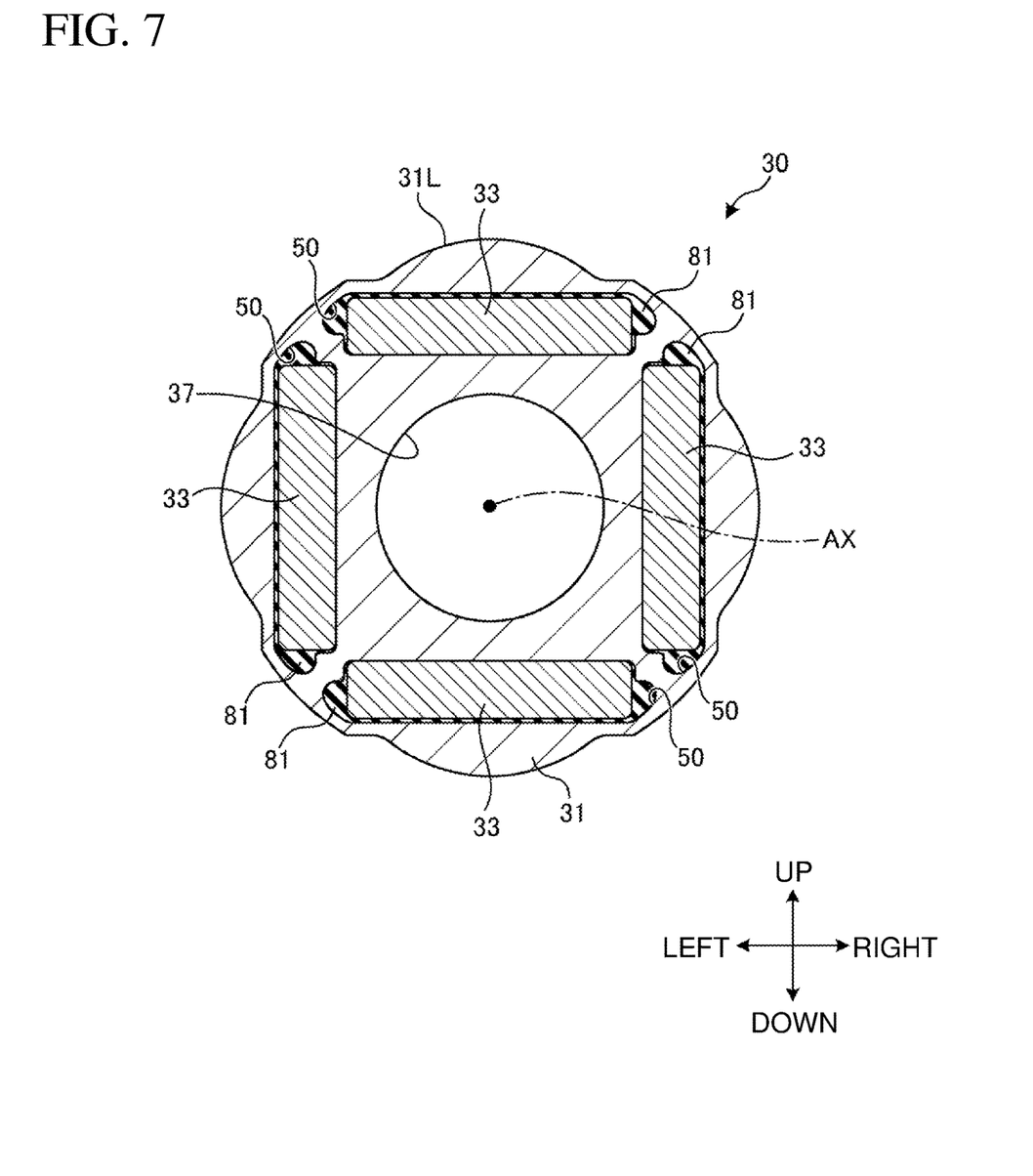
FIG. 7 is a cross-sectional view of the rotor in the embodiment.

FIGS. 3 and 4 are exploded perspective views of an example of the rotor 30. FIGS. 3 and 4 show different angles of view. FIG. 5 is a rear view of the rotor 30. FIGS. 4 and 5 do not show a fan 17. FIG. 6 is a top view of the rotor 30. FIG. 7 is a cross-sectional view of an example of the rotor 30. FIG. 7 is a cross-sectional view taken along line A-A in FIG. 6 as viewed in the direction indicated by arrows. In FIG. 6 and FIG. 7, the rotor shaft 32 and the structure on the rotor shaft 32 are eliminated. As shown in FIGS. 3 to 7, the rotor core 31 includes multiple steel plates stacked on one another. The steel plates are metal plates formed from iron as a main component. The rotor core 31 surrounds the rotation axis AX.

The rotor core 31 is substantially cylindrical. The rotor core 31 in the present embodiment has an outer diameter X of, for example, 30 mm or less. The outer diameter X of the rotor core 31 is the distance between the rotation axis AX and an outer circumferential surface 31L of the rotor core 31. The rotor core 31 has a front end face 31F and a rear end face 31R. The rotor core 31 has an opening 37 in its center. The opening 37 extends through the end faces 31F and 31R of the rotor core 31.

The rotor shaft 32 extends in the axial direction. The rotor shaft 32 is located inward from the rotor core 31. The rotor core 31 is fixed to the rotor shaft 32. The rotor shaft 32 includes a front portion protruding frontward from the end face 31F of the rotor core 31. The rotor shaft 32 includes a rear portion protruding rearward from the end face 31R of the rotor core 31. The rotor shaft 32 includes the front portion rotatably supported by a front bearing (not shown). The rotor shaft 32 includes the rear portion rotatably supported by a rear bearing (not shown).

The rotary blade 120 is an output unit for the power tool 100, which is driven directly or indirectly by an output gear 32A. The rotary blade 120 may be directly fixed to the rotor shaft 32. In other words, the motor 103 in the present embodiment may drive the rotary blade 120 with a direct drive system. In this case, a reducer is not located between the motor 103 and the rotary blade 120. The reducer may be located between the motor 103 and the rotary blade 120. Thus, the rotary blade 120 functioning as the output unit for the power tool 100 may be indirectly driven by the rotor 30. This allows the rotary blade 120 to be driven at higher torque.

The permanent magnets 33 are fixed to the rotor core 31. The permanent magnets 33 in the embodiment are located inside the rotor core 31. A motor 6 is an interior permanent magnet (IPM) motor. In the embodiment, four permanent magnets 33 surround the rotation axis AX.

A sleeve 35 surrounds the front portion of the rotor shaft 32. The sleeve 35 is fixed to the rotor shaft 32. The sleeve 35 is formed from a metal such as brass. The sleeve 35 functions as a balancer that adjusts the rotational balance of the rotor 30 in the front portion of the rotor shaft 32. More specifically, when the rotational balance of the rotor 30 is inappropriate, the sleeve 35 is partially cut.

The fan 17 is fixed to the rear portion of the rotor shaft 32. The fan 17 is located rearward from the rotor core 31. The fan 17 at least partially faces the end face 31R of the rotor core 31. As the rotor shaft 32 rotates, the fan 17 rotates together with the rotor shaft 32. Thus, cooling air flows from the inlets 111A into the motor compartment 111.

The rotor core 31 has multiple (four in the present embodiment) magnet slots 50 located circumferentially at intervals. The multiple magnet slots 50 are located circumferentially at equal intervals. The multiple magnet slots 50 have the same shape in a plane perpendicular to the rotation axis AX. The multiple magnet slots 50 have the same dimensions in a plane perpendicular to the rotation axis AX.

The permanent magnets 33 are received in the corresponding magnet slots 50. The multiple (four in the present embodiment) permanent magnets 33 surround the rotation axis AX. The four magnet slots 50 each receive a single permanent magnet 33. Each permanent magnet 33 is a rectangular plate elongated in the axial direction.

The surface of each permanent magnet 33 in the corresponding magnet slot 50 and at least a part of the inner surface of the magnet slot 50 define a space between them. The space receives a resin member 80. The resin member 80 includes fillers 81 and an annular portion 82. The space is filled with the corresponding filler 81 (refer to FIG. 7). The fillers 81 fix the permanent magnets 33 in the magnet slots 50.

The annular portion 82 protrudes from the end face 31R of the rotor core 31 in one direction along the rotation axis AX (first axial direction). The first axial direction in the present embodiment is in the direction in which the fan 17 is located, or rearward from the rotor core 31. The annular portion 82 is annular about the rotation axis AX. The annular portion 82 has an outer circumferential surface 82B and an inner circumferential surface 82C (refer to FIG. 5). The outer circumferential surface 82B and the inner circumferential surface 82C are cylinder surfaces. The annular portion 82 has a thickness TH as the difference of, for example, 6 mm or greater between an outer diameter LD and an inner diameter SD. The outer diameter LD is the distance between the rotation axis AX and the outer circumferential surface 82B.

The inner diameter SD is the distance between the rotation axis AX and the inner circumferential surface 82C. The thickness TH may be 5 mm or greater. The annular portion 82 includes a leading end face 82A. The leading end face 82A is a leading end face of the annular portion 82 in the protruding (rearward) direction. The leading end face 82A is, for example, flat. The annular portion 82 has a height LH from the end face 31R of the rotor core 31 to the leading end face 82A of, for example, 6 mm.

The annular portion 82 includes a cut portion 83 and an uncut portion 84. The cut portion 83 is a cut portion of the annular portion 82. The cut portion 83 is formed by, for example, cutting the annular portion 82. The cut portion 83 is, for example, at a single position on the annular portion 82.

The annular portion 82 includes a portion extending in a direction about the rotation axis AX with a less weight than another portion of the annular portion 82 including the cut portion 83. Thus, the rotational balance of the rotor 30 can be adjusted by forming the cut portion 83 at a position corresponding to a portion of the rotor 30 with a weight greater than other portions of the rotor 30 extending in the direction about the rotation axis AX.

The angle θ of the cut portion 83 in the direction about the rotation axis AX may be selected as appropriate for the rotational balance of the rotor 30. For example, the annular portion 82 without the cut portion 83 is placed on the end face 31R. The rotational balance of the rotor 30 is measured in this state. In this case, the rotational balance can be adjusted as appropriate by forming the cut portion 83 at an angle θ corresponding to the weight at a position corresponding to the portion with a weight greater than the other portions of the annular portion 82.

The angle θ of the cut portion 83 may be, for example, 180° or less. In the structure according to the present embodiment, the cut portion 83 is located in an area with the angle θ of 180°, but the cut portion 83 is not limited to this structure. The angle θ of the cut portion 83 may be another angle in the direction about the rotation axis AX, such as 30°, 45°, 60°, 90°, 120°, or 135°. The cut portion 83 may not be formed when the rotational balance of the rotor 30 is not to be adjusted.

The uncut portion 84 is a portion remaining uncut when the cut portion 83 is formed in the annular portion 82. The uncut portion 84 extends along the range of the annular portion 82 in which the cut portion 83 is located. The uncut portion 84 is in contact with the end face 31R of the rotor core 31. The uncut portion 84 includes a flat cut surface 84A. The annular portion 82 has a cut height SH from the end face 31R of the rotor core 31 to the cut surface 84A of, for example, 1 mm or greater. The cut portion 83 has a depth DP, which is the depth from the leading end face 82A of the annular portion 82 to the cut surface 84A, of 5 mm or less.

Figure 8:
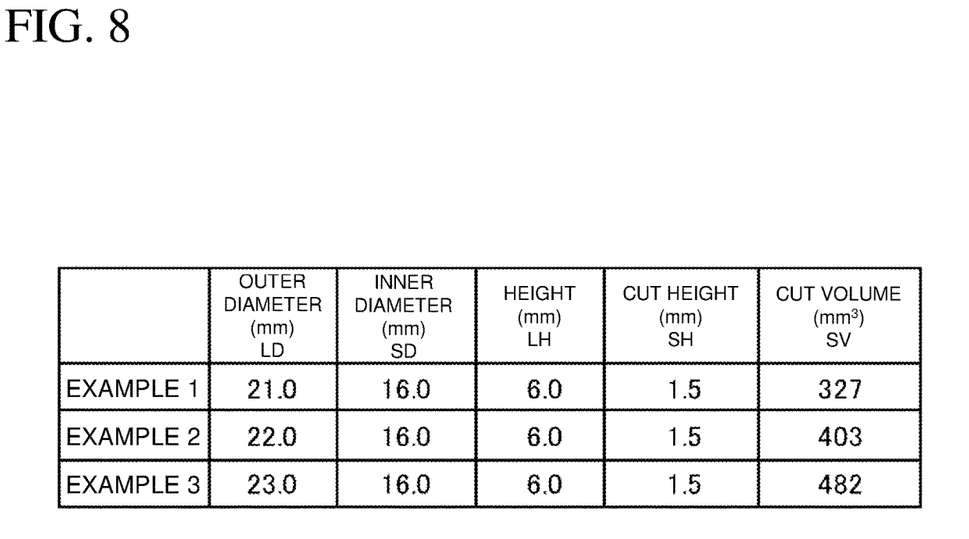
FIG. 8 is a table showing the outer diameter, the inner diameter, the height, and the cut height of an annular portion in the embodiment.

FIG. 8 is a table showing the outer diameter LD, the inner diameter SD, the height LH, and the cut height SH of the annular portion 82 in the present embodiment. In each of examples 1 to 3 described below, the rotor core 31 has an outer diameter of 30 mm or less. The angle θ of the cut portion 83 in the direction about the rotation axis AX is 180° in each example.

The annular portion 82 in example 1 has the outer diameter LD of 21.0 mm, the inner diameter SD of 16.0 mm, the height LH of 6.0 mm, and the cut height SH of 1.5 mm. In this case, the depth DP of the cut portion 83 is 4.5 mm and the volume of the cut portion 83 (cut volume) is 327 mm$^3$.

The annular portion 82 in example 1 showed no breakage from the fillers 81 after a predetermined number of rotations of the rotor 30 relative to the stator 20 repeated at a speed of 32000 rpm.

The annular portion 82 in example 2 has the outer diameter LD of 22.0 mm, the inner diameter SD of 16.0 mm, the height LH of 6.0 mm, and the cut height SH of 1.5 mm. In this case, the depth DP of the cut portion 83 is 4.5 mm and the volume of the cut portion 83 (cut volume) is 403 mm$^3$.

The annular portion 82 in example 2 showed no breakage from the fillers 81 after a predetermined number of rotations of the rotor 30 relative to the stator 20 repeated at a speed of 32000 rpm.

The annular portion 82 in example 3 has the outer diameter LD of 23.0 mm, the inner diameter SD of 16.0 mm, the height LH of 6.0 mm, and the cut height SH of 1.5 mm. In this case, the depth DP of the cut portion 83 is 4.5 mm and the volume of the cut portion 83 (cut volume) is 482 mm$^3$.

The annular portion 82 in example 3 showed no breakage from the fillers 81 after a predetermined number of rotations of the rotor 30 relative to the stator 20 repeated at a speed of 32000 rpm.

To use the power tool 100, an operator grips the grip 112 and operates the trigger switch 105. Thus, power is fed from the battery pack 121 to the motor 103 to activate the motor 103. This rotates the rotor shaft 32 in the rotor 30. A rotational force of the rotor shaft 32 is transmitted to the rotary blade 120 to rotate the rotary blade 120.

The annular portion 82 is located on the end face 31R of the rotor core 31 and the annular portion 82 includes the cut portion 83. The rotor 30 is adjusted to rotate in a well-balanced manner with the cut portion 83 in the annular portion 82. The rotational balance of the rotor 30 can be adjusted as appropriate without a sleeve or another member formed from brass being placed on the rear end of the rotor shaft 32.

The rotor shaft 32 is rotatable relative to the stator 20 at a speed of 30000 rpm or greater. In this case, the annular portion 82 receives stress and is likely to break and be separate from the fillers 81. In the present embodiment, the values of the outer diameter LD, the inner diameter SD, the height LH, and the cut height SH of the annular portion 82 are set to the above values to reduce the likelihood that the annular portion 82 is separate from the fillers 81 although the rotor shaft 32 rotates relative to the stator 20 at a high speed of 30000 rpm or greater.

The power tool 100 according to the present embodiment includes the stator 20, the rotor 30 rotatable relative to the stator 20 at a speed of 30000 rpm or greater, and the rotary blade 120 being the output unit drivable by the rotor 30. The stator 20 includes the stator core 21, the front insulator 22 and the rear insulator 23 fixed to the stator core 21, and the coils 24 held on the front insulator 22 and the rear insulator 23. The rotor 30 includes the rotor core 31, the permanent magnets 33 received in the magnet slots 50 in the rotor core 31, and the resin member 80 fixing the rotor core 31 and the permanent magnets 33. The resin member 80 includes the annular portion 82 protruding from the end face 31R of the rotor core 31. The annular portion 82 includes the cut portion 83.

This structure facilitates adjustment of the rotational balance of the rotor 30 as appropriate. When the rotor 30 rotates relative to the stator 20 at a speed of 30000 rpm or greater, the resin member 80 can be prevented from breaking as appropriate. Thus, the power tool 100 includes the resin member 80 in the rotor 30 that is less susceptible to breaking.

The cut portion 83 in the present embodiment is located in the range of 180° or less in the direction about the rotation axis AX of the rotor 30.

This increases the strength of the annular portion 82. Thus, when the rotor 30 rotates relative to the stator 20 at a speed of 30000 rpm or greater, the resin member 80 can be prevented from breaking as appropriate.

The annular portion 82 in the present embodiment includes the uncut portion 84 along the range in which the cut portion 83 is located. The uncut portion 84 is in contact with the end face 31R of the rotor core 31.

This increases the strength of the annular portion 82. Thus, when the rotor 30 rotates relative to the stator 20 at a speed of 30000 rpm or greater, the resin member 80 can be prevented from breaking as appropriate.

The uncut portion 84 in the present embodiment has a height of 1 mm or greater from the end face 31R of the rotor core 31.

This increases the strength of the annular portion 82. Thus, when the rotor 30 rotates relative to the stator 20 at a speed of 30000 rpm or greater, the resin member 80 can be prevented from breaking as appropriate.

The cut portion 83 in the present embodiment has the depth DP of 5 mm or less from the leading end 82A of the annular portion 82 in the protruding direction of the annular portion 82.

This increases the strength of the annular portion 82. Thus, when the rotor 30 rotates relative to the stator 20 at a speed of 30000 rpm or greater, the resin member 80 can be prevented from breaking as appropriate.

The rotor core 31 in the present embodiment has an outer diameter of 30 mm or less. The annular portion 82 has the thickness TH as the difference of 6 mm or greater between the outer diameter LD and the inner diameter SD.

This sufficiently increases the radial thickness of the annular portion 82 with respect to the outer shape of the rotor core 31. Thus, when the rotor 30 rotates relative to the stator 20 at a speed of 30000 rpm or greater, the resin member 80 can be prevented from breaking as appropriate.

In the present embodiment, the rotor 30 includes the fan 17 located in the first axial direction along the rotation axis AX from the rotor core 31. The fan 17 rotates together with the rotor core 31. The annular portion 82 is located on the end face 31R of the rotor core 31 facing the fan 17.

This facilitates adjustment of the rotational balance of the rotor core 31 in the first axial direction.

Figure 9:
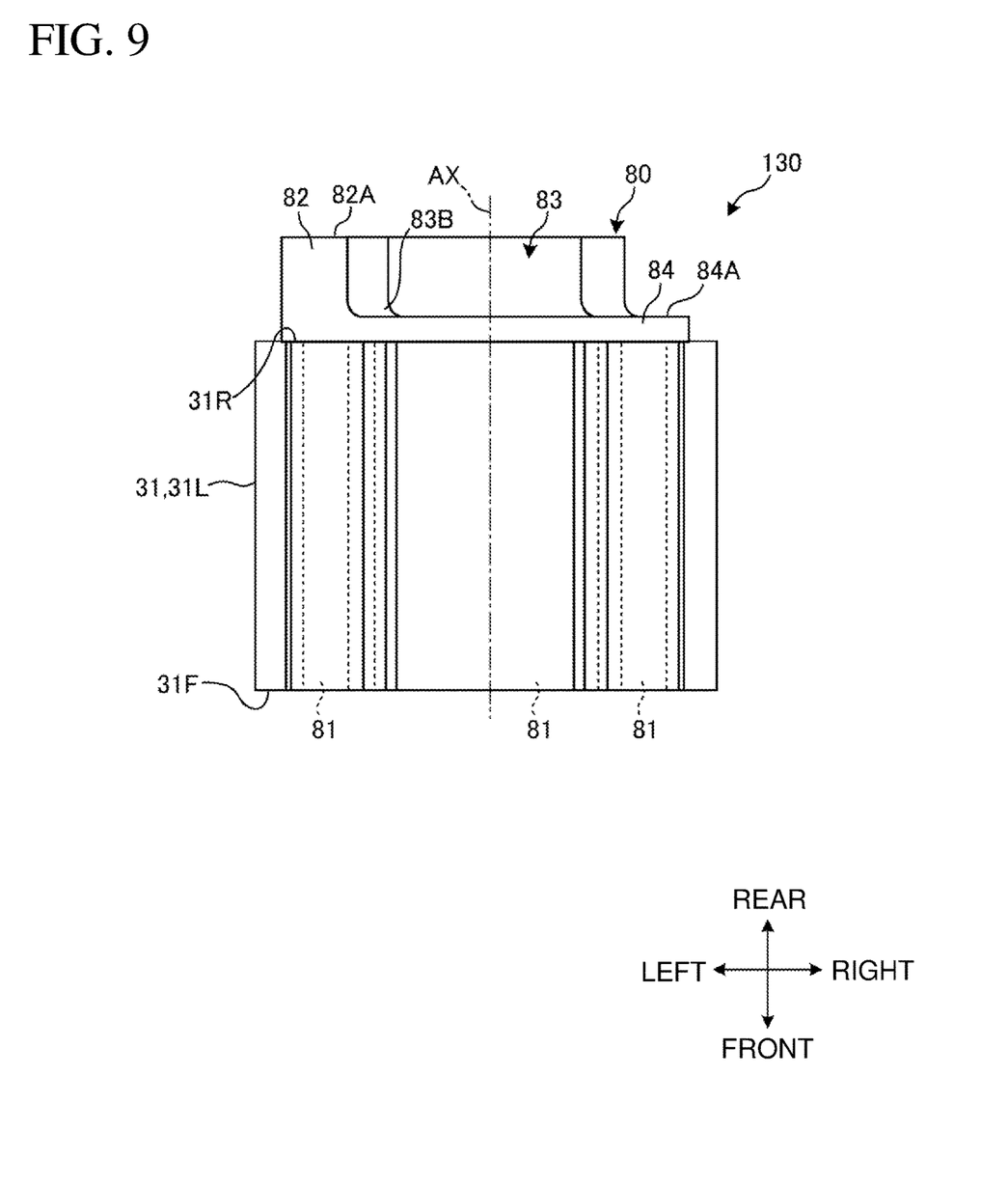
FIG. 9 is a diagram of a rotor in a modification.

The present disclosure is not limited to the above embodiment, and the embodiment may be modified without departing from the spirit and scope of the present disclosure. In the above embodiment, for example, the cut portion 83 includes the base portion being angular in an example, but the structure is not limited to this. FIG. 9 is a perspective view of a rotor 130 in a modification. As shown in FIG. 9, the rotor 130 may include a cut portion 83 with a curved base portion 83B. This increases the strength of the annular portion 82. Thus, when the rotor 30 rotates relative to the stator 20 at a speed of 30000 rpm or greater, the resin member 80 can be prevented from breaking as appropriate.

Figure 10:
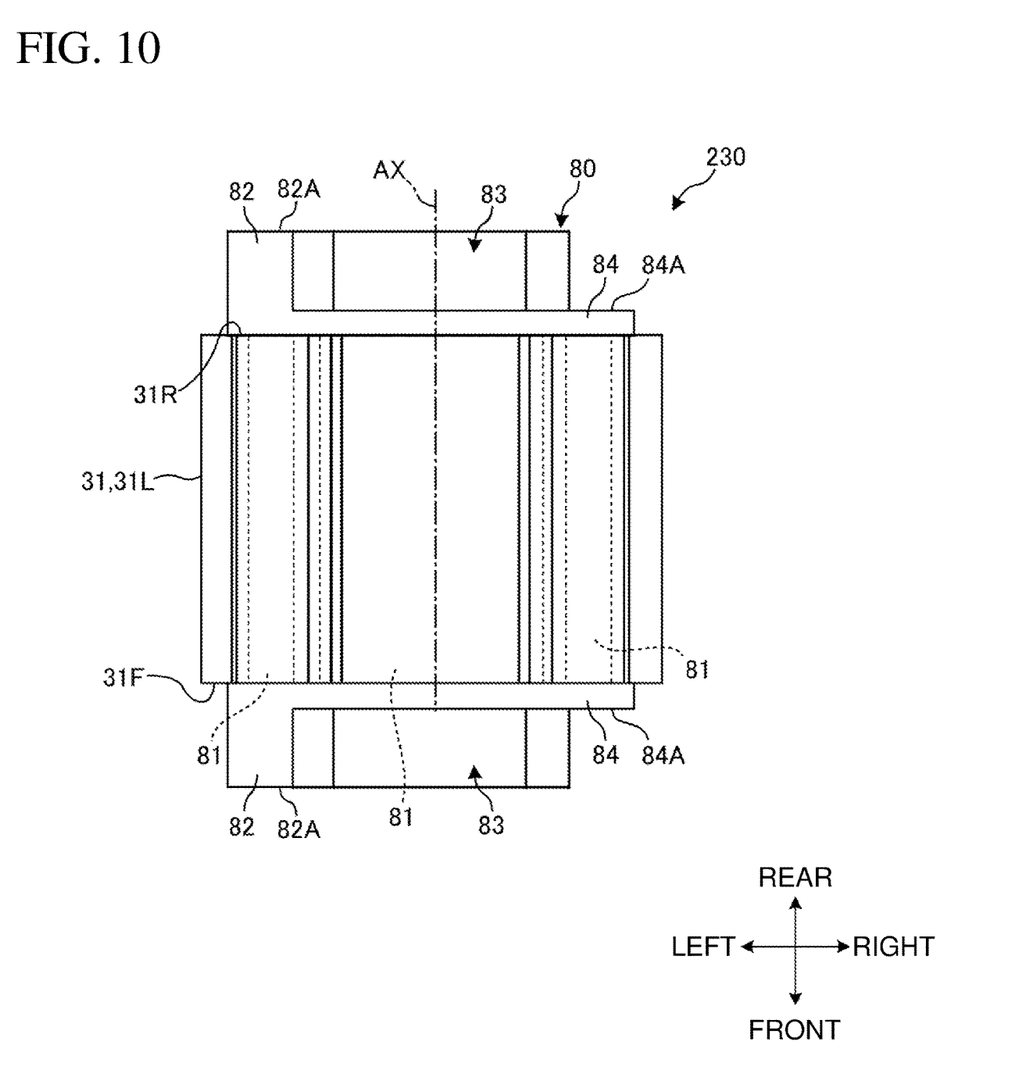
FIG. 10 is a diagram of a rotor in a modification.

In the above embodiment, the annular portion 82 is located on the rear end face 31R of the rotor core 31 in an example, but the structure is not limited to this. FIG. 10 is a perspective view of a rotor 230 in a modification. As shown in FIG. 10, the rotor 230 includes annular portions 82 located on the end faces 31F and 31R at both ends of the rotor core 31 in the axial direction along the rotation axis AX. This facilitates adjustment of the rotational balance at both ends of the rotor core 31 in a direction along the rotation axis AX as appropriate.

In the above embodiments, the power tool 100 is a circular saw. The power tool is not limited to a circular saw. Examples of the power tool include a driver drill, a vibration driver drill, an angle drill, an impact driver, a grinder, a hammer, a hammer drill, and a reciprocating saw.

In the above embodiments, the electric work machine is powered by the battery pack attached to the battery mount. In some embodiments, the electric work machine may use utility power (alternating current power supply).

REFERENCE SIGNS LIST 17 fan
20 stator
21 stator core
21T tooth
22 front insulator
22T, 23T protrusion
23 rear insulator
24 coil
26 fusing terminal
28 insulating member
29 connection wire
30, 130, 230 rotor
31 rotor core
31F, 31R end face
32 rotor shaft
33 permanent magnet
35 sleeve
37 opening
50 magnet slot
80 resin member
81 filler
82 annular portion
82A leading end face
82B outer circumferential surface
82C inner circumferential surface
83 cut portion
83B base portion
84 uncut portion 84A cut surface
100 power tool
101 housing
102 battery mount
103 motor
104 controller
105 trigger switch
106 base
111 motor compartment
112 grip
113 controller compartment
117 left support
118 right support
119 fixed cover
120 rotary blade
121 battery pack
AX rotation axis

What is claimed is:

1. A power tool, comprising:
a stator including
a stator core,
an insulator fixed to the stator core, and
a coil held on the insulator;
a rotor rotatable relative to the stator at a speed of 30000 revolutions per minute or greater, the rotor including
a rotor core having a slot,
a permanent magnet received in the slot in the rotor core, and
a resin member fixing the rotor core and the permanent magnet, the resin member including an annular portion protruding from an end face of the rotor core, the annular portion including a cut portion; and
an output unit drivable by the rotor.

2. The power tool according to claim 1, wherein the cut portion is located in a range of 180° or less in a direction about a rotation axis of the rotor.

3. The power tool according to claim 1, wherein the annular portion includes an uncut portion along a range in which the cut portion is located, and the uncut portion is in contact with the end face of the rotor core.

4. The power tool according to claim 1, wherein the cut portion includes a curved base portion.

5. The power tool according to claim 3, wherein the uncut portion has a height of 1 mm or greater from the end face of the rotor core.

6. The power tool according to claim 1, wherein the cut portion has a depth of 5 mm or less from a leading end of the annular portion in a protruding direction of the annular portion.

7. The power tool according to claim 1, wherein the rotor core has an outer diameter of 30 mm or less, and the annular portion has a difference of 6 mm or greater between an outer diameter and an inner diameter.

8. The power tool according to claim 1, wherein the rotor includes a fan located in a first axial direction along a rotation axis of the rotor from the rotor core, the fan is rotatable together with the rotor core, and the annular portion is located on the end face of the rotor core in the first axial direction.

9. The power tool according to claim 1, wherein the annular portion is located on each of two end faces of the rotor core in a direction along a rotation axis of the rotor.

10. The power tool according to claim 2, wherein the annular portion includes an uncut portion along a range in which the cut portion is located, and the uncut portion is in contact with the end face of the rotor core.

11. The power tool according to claim 2, wherein the cut portion includes a curved base portion.

12. The power tool according to claim 3, wherein the cut portion includes a curved base portion.

13. The power tool according to claim 2, wherein the cut portion has a depth of 5 mm or less from a leading end of the annular portion in a protruding direction of the annular portion.

14. The power tool according to claim 3, wherein the cut portion has a depth of 5 mm or less from a leading end of the annular portion in a protruding direction of the annular portion.

15. The power tool according to claim 4, wherein the cut portion has a depth of 5 mm or less from a leading end of the annular portion in a protruding direction of the annular portion.

16. The power tool according to claim 5, wherein the cut portion has a depth of 5 mm or less from a leading end of the annular portion in a protruding direction of the annular portion.

17. The power tool according to claim 2, wherein the rotor core has an outer diameter of 30 mm or less, and the annular portion has a difference of 6 mm or greater between an outer diameter and an inner diameter.

18. The power tool according to claim 3, wherein the rotor core has an outer diameter of 30 mm or less, and the annular portion has a difference of 6 mm or greater between an outer diameter and an inner diameter.

19. The power tool according to claim 4, wherein the rotor core has an outer diameter of 30 mm or less, and the annular portion has a difference of 6 mm or greater between an outer diameter and an inner diameter.

20. The power tool according to claim 5, wherein the rotor core has an outer diameter of 30 mm or less, and the annular portion has a difference of 6 mm or greater between an outer diameter and an inner diameter.

* * * * *